(No Model.)

J. SAURER.
CLEANER FOR THE PLOW POINT OF GRAIN DRILLS.

No. 244,318. Patented July 12, 1881.

Witnesses
W. A. Numsen
A. E. Eader

Inventor:
John Saurer
By his Atty
Chas B. Mann

UNITED STATES PATENT OFFICE.

JOHN SAURER, OF ORRVILLE, OHIO.

CLEANER FOR THE PLOW-POINTS OF GRAIN-DRILLS.

SPECIFICATION forming part of Letters Patent No. 244,318, dated July 12, 1881.

Application filed May 11, 1881. (No model.)

*To all whom it may concern:*

Be it known that I, JOHN SAURER, a citizen of the United States, residing at Orrville, in the county of Wayne and State of Ohio, have invented certain new and useful Improvements in Cleaners for the Plow-Points of Grain-Drills; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to an improved device for cleaning the points of grain-drill tubes, the object being to provide a more simple and effective piece of mechanism for operating the scraper against the tube.

The construction of the parts will first be described, and the invention will then be designated in the claim.

Figure 1:
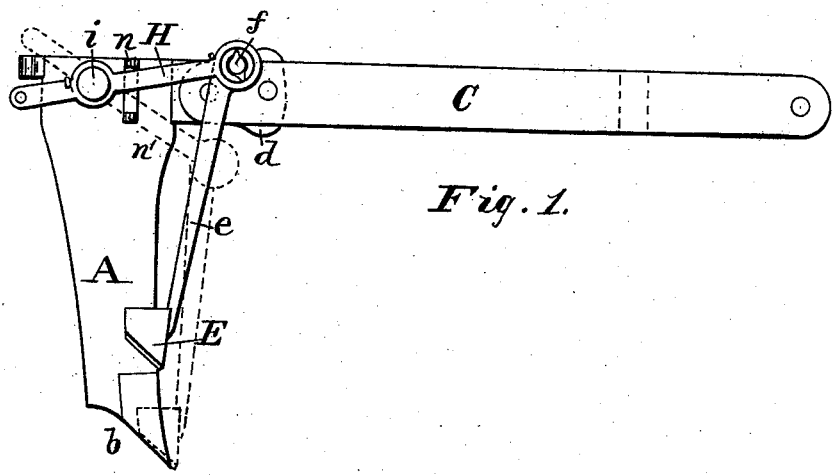
Figure 2:
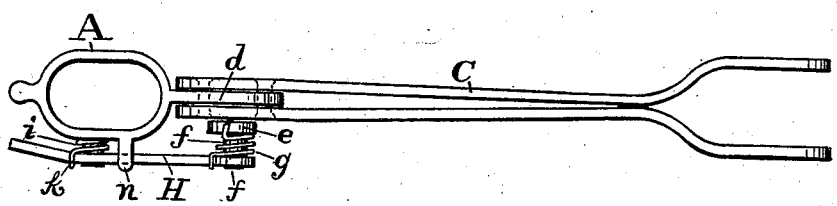

In the drawings herewith, Figure 1 is a side view, and Fig. 2 a top view, of the device.

The letter A designates the drill-tube, having an ordinary steel point, $b$. This tube is attached at $d$ to one end of the bar C, which may be single or double. The forward end of the bar is pivoted, as usual, to the frame of the drill.

The scraper E has such partial circular form as adapts it to fit about the front of the drill-tube. It is attached to a rod or shank, $e$, extending in a vertical direction, which has at its upper end a laterally-projecting short arm or spindle, $f$, at the extremity of which one end of the horizontal lever H is pivoted. This lever works in a vertical plane. A spiral spring, $g$, is so placed and fastened about the short arm and brought to bear on the lever H that it keeps the shank $e$ and its scraper normally pressed against or in contact with the drill-tube. The lever H is pivoted on a short arm, $i$, in suitable position near the top of the drill-tube, and a spiral or other suitable spring, $k$, is so attached at the pivotal point of the lever, and made to bear on said lever, that the end of the lever to which the shank of the scraper is pivoted is held normally up. Thereby the scraper is withdrawn from and kept above the point of the drill-tube, as shown in Fig. 1. When this end of the lever is depressed the scraper is forced down, as indicated by dotted lines, whereby the tube and point are cleaned.

A short projecting stud, $n$, located above, and another, $n'$, below, the lever, serve to restrict its movement.

It will be noticed the lever which is attached to and operates the scraper is on the side of the drill-tube at its top and extends back thereof, by which position and arrangement I obtain the desideratum of keeping the space below the bar C clear of mechanism.

The lever is operated by any suitable mechanism, which connects with the end $p$.

It will be understood that while only one drill-tube and scraping device is shown in the drawings this improvement is designed and is adapted for any of the ordinary grain or fertilizer drills in which a gang of drill-tubes are embodied.

A device of this description obviates the necessity to stop the drill to clean the tubes while at work in the field.

A special advantage of the construction and arrangement herein shown of the vertical shank of the scraper and the horizontal lever at the top and back of the drill-tube is that the space in front of said tube and below the draft-bar is unobstructed by mechanism, as it is in the device shown in Letters Patent of the United States granted me July 13, 1880, No. 230,068.

Having described my invention, I claim and desire to secure by Letters Patent of the United States—

The combination, with the drill-tube, of a scraper, E, to clean the front of the tube, provided with a shank, $e$, extending in a vertical direction, a horizontal lever, H, at the top of the drill-tube, and pivoted directly to the shank of the scraper, and a spring, $g$, at the pivoting-point of the scraper-shank and lever, as set forth.

JOHN SAURER.

Witnesses:
H. M. WILSON,
JOSEPH HOLTZER.